United States Patent Office 3,830,874
Patented Aug. 20, 1974

3,830,874
EPOXY-AMINE ADHESIVES OF SUPERIOR TOUGHNESS
James Francis Vasil, Whitford, Md., and Joseph S. Bursel, Lakehurst, N.J., assignors to American Cyanamid Company, Stamford, Conn.
No Drawing. Continuation-in-part of abandoned application Ser. No. 169,500, Aug. 5, 1971. This application July 5, 1973, Ser. No. 376,489
Int. Cl. C08g 45/06
U.S. Cl. 260—830 R    9 Claims

ABSTRACT OF THE DISCLOSURE

Thermosetting epoxy-amine adhesive compositions which have a uniformly distributed content of a water-insoluble rubbery polymer at least 10 mol percent composed of epichlorohydrin linkages and having a molecular weight of at least 100,000 possess improved toughness. These compositions find use in the manufacture of aircraft wing and fuselage sections.

---

This is a continuation-in-part of our copending application Ser. No. 169,500, filed on Aug. 5, 1971, now abandoned.

The present invention relates to novel thermosetting adhesive compositions of the epoxy-amine type. The invention includes such compositions in bulk and in film and sheet form (with and without textile filler), and laminates bonded together by the composition in thermoset state.

Epoxy-amine adhesive compositions constitute an important and widely used group of industrial high-strength adhesives. They consist in general of a homogeneous mixture of one or more polyfunctional epoxy compounds and one or more polyfunctional amines as curing agent therefor, or they may be a low-stage inter-reaction product of these materials. The compositions form an adhesive of great tenacity when hot-pressed between two surfaces so that they thermoset. Compositions of this type are disclosed in Encyclopedia of Chemical Technology by Kirk-Othmer (2nd Ed., vol. 8, pp. 204–312, New York, 1965), and in U.S. Pats. Nos. 2,615,007; 2,915,490; 2,951,824; 2,986,546; 3,371,008; and 3,386,955. A typical example of such a composition is a mixture of the diglycidyl ether of bisphenol A and ethylenediamine.

For convenience these materials are hereinafter termed "thermosetting epoxy-amine adhesive compositions."

It is a disadvantage of these compositions that they are somewhat brittle when thermoset. As a result, joints cemented with these compositions tend to fail when the joined articles are sharply struck or when the joints are subjected to prolonged vibration or peeling forces. Since a principal use for these compositions is in the cementing of sheet aluminum for use as wing, fuselage and other sections of civilian and military aircraft, a demand has arisen for such compositions which provide a tougher and stronger bond.

The discovery has now been made that compositions of the class described provide tougher and stronger bonds when they have a uniformly distributed content of a water-insoluble rubbery epichlorohydrin polymer. In the composition the epichlorohydrin thus acts as latent toughening agent and develops its toughening properties when the adhesive components of the composition are thermoset. In preferred instances, amounts of the epichlorohydrin polymer in the minor range of 10%–25% produce increases in shear of better than 90% at room temperature, 60% at 180° F. and 80% at −67° F., and despite these increases they produce laminations which possess very good peel strength at these temperatures.

We have found that in preferred instances the invention provides the following additional advantages:
1. The compositions are easily prepared in simple equipment, and no special techniques or controls need be utilized.
2. The compositions possess unusually long stability at room temperature.
3. They possess good cold tack for most industrial metal surfaces. Hence the adhesive in sheet or film form is easily and conveniently applied to the undersides of structural surfaces.
4. They possess a strong affinity for synthetic polyester, polyacrylonitrile and polyamide fibers, glass fibers and aluminum threads. Fabrics formed of these materials and impregnated with the compositions of the present invention form outstandingly tough structures when the composition is thermoset.
5. The bonds possess unusually good resistance to water, salt spray and atmospheric humidity.

The rubbery polymer which is present in the adhesive compositions of the present invention may be poly-epichlorohydrin itself, or the polymer may be a copolymer of epichlorohydrin and a different alkylene mono-oxide copolymerizable therewith. The polymer therefore comprises epicholorohydrin linkages having the theoretical formula:

(1) 

and, taking the linkages derived from ethylene oxide and propylene oxide as examples, it may also contain linkages having the theoretical formulae:

(2)             $-CH_2CH_2-O-$ and (3) 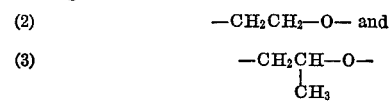

Alkylene mono-oxides other than ethylene and propylene oxide may also be employed. Suitable alkylene mono-oxides are those which, when copolymerized in minor molar ratio with epichlorohydrin, a yield a water-insoluble polymer having a toughness and resiliency which resembles crêpe rubber.

The epichlorohydrin polymer present in the compositions of the present invention is of high molecular weight. The reason why a high molecular weight is necessary has not been ascertained and we do not wish to be bound by any theory. We believe, however, that when the polymer is of high molecular weight it possesses a special compatibility with the epoxy-amine components in that as the epoxy-amine components thermoset to form a uniform adhesive phase, the epichlorohydrin polymer precipitates into discrete zones with the adhesive phase and that it thereby forms a composition of special morphology which in preferred embodiments possesses an unusually high capacity for the absorption of stress and strain, and which thus provides superior toughness to the composition.

The smallest epichlorohydrin polymer which provides improved toughness to a practical extent has a molecular weight of roughly 100,000 (corresponding to about 1,100 polymer units in the case of polyepichlorohydrin and somewhat more in the cases of polymers formed of epichlorohydrin and alkylene oxy linkages). Even at this comparatively low molecular weight the polymer is definitely a rubber. It possesses substantially no surface tack and resembles crêpe rubber to the touch. The present invention includes compositions which contain the polymer of this molecular weight.

The polymer provides better toughening action as its molecular weight increases to the point where the polymer is as viscous even in admixture with a large proportion of solvent that it is unduly difficult to form it into a homogeneous blend with the adhesive components of the mix.

The maximum useful molecular weight for the polymer has not been determined but evidently is in excess of 5,000,000. Because of the good mixing and toughening properties possessed by the polymer in its molecular weight range of 500,000–5,000,000, the polymer in this range is preferred.

At low molecular weight (i.e. at a molecular weight where the polymer is a liquid or a non rubbery solid) the polymer does not provide compositions having the principal properties of the compositions of the present invention. Thus, when a homogeneous mixture of epoxy-amine adhesive components and a low molecular weight epichlorohydrin polymer thermosets, the low molecular weight epichlorohydrin polymer remains in admixture with the adhesive phase and does not provide the special morphology referred to above. It thus acts only as a conventional, soluble plasticizer. This action is detrimental because it causes a significant decrease in the strength of the adhesive phase at room and at elevated temperatures. A property of primary importance for the adhesive is strength.

The alkylene mono-oxide linkages, when present, act as spacers or diluents for the epichlorohydrin linkages, and in general the polymers, on an equivalent basis at equal molecular weight, decrease in effectiveness as the number of such linkages increases. We prefer polyepichlorohydrin itself, therefore, but we include the copolymers within the scope of the invention because the epichlorohydrin linkages are effective in small proportion (e.g. about 10 mol percent). The diluent linkages thus permit a decrease in the amount of more costly epichlorohydrin needed without undue sacrifice in the toughness-imparting properties of the epichlorohydrin linkages. In the present specification, therefore, the term "epichlorohydrin polymer" includes polyepichlorohydrin itself and copolymers of epichlorohydrin with major amounts, up to 90 mol percent, of at least one alkylene mono-oxide copolymerizable therewith.

The compositions of the present invention are conveniently prepared by mixing a polyfunctional epoxide, a polyfunctional amine, a rubbery epichlorohydrin polymer and sufficient of a volatile mutual inert solvent to convert the mixture to a syrup of a convenient viscosity. The mixture is stirred until homogeneous. An elevated temperature is preferred as this decreases the amount of solvent needed for the development of a composition of stirrable viscosity.

The mixing is more conveniently performed at elevated temperature, for example 150° F. The resulting syrup may be used at once at that temperature, but should be cooled to room temperature and preferably lower if stored. The solvent can be evaporated under vacuum.

If desired, the resulting syrup can be extruded hot as a thin coating upon release paper and the resulting coated paper can be wound into a roll. Most of the solvent volatilizes as the syrup leaves the extrusion slot. When cool, the adhesive is a strong rubbery gel which can be peeled intact from the release paper. It can be handled conveniently but possesses sufficient tack so that it adheres firmly when pressed against the underside of stainless steel, aluminum, nickel, copper and chromium sheeting.

Textile (cloth) composed of glass, Orlon, Dacron, aluminum, nylon and stainless steel fibers can be impregnated with the hot syrup, and structures of great hardness and toughness develop when the adhesive content thereof is thermoset. The thermoset cloth, before thermosetting, can be employed as adhesive in the same manner as the unsupported film, but the cloth acts as spacer, maintaining the surfaces to be laminated at a predetermined distance apart.

As little as 10% of the epichlorohydrin polymer, based on the combined weights of the epoxide and amine components, produces a substantial improvement in the toughness of the adhesive composition, so that evidently there is no amount, however small, which will not produce at least some benefit. The maximum effective amounts has not been ascertained, but amounts at least up to 40% of the weight of the epoxide and amine components have also produced improvements in toughness. However, the optimum amount in any instance can be found by laboratory trial, by methods illustrated in the examples.

The present invention appears to be primarily a physical one, in that we have no evidence that the rubbery polymer reacts with the other components of the composition either before or after they are thermoset. The invention, therefore, appears to be of general applicability and is not limited to any particular group of epoxides or amines.

The epichlorohydrin polymers present in the adhesive compositions of the present invention possess at most only a negligible proportion of reactive substituents. Thus, the lowest molecular weight polymer of practical use within the scope of this invention (molecular weight 100,000) contains only about 0.2 mol percent of reactive substituents. On the other hand, polymers having molecular weights of 500,000 and 2,800,000 respectively impart very satisfactory toughening effect but respectively contain only about 0.044 and 0.006 mol percent of reactive substituents. These percentages are far too small to explain the pronounced toughening effect which the polymers impart to epoxy-amine adhesive compositions, and so should be neglected.

The invention is further illustrated by the examples which follow. These examples are best embodiments of the invention and are not to be construed as limitations thereon.

EXAMPLE 1

The following illustrates the preparation of a preferred adhesive composition of the present invention showing the toughening effect of increasing proportions of an epichlorohydrin polymer.

Into 100 parts by weight of a solid bisphenol A-epichlorohydrin condensate (the diglycidyl ether of bisphenol A) having an epoxy equivalent weight of approximately 500 is thoroughly mixed at 150° F. 10 parts by weight of a rubbery epichlorohydrin-ethylene oxide copolymer (prepared by copolymerizing the two materials in 4:1 molar ratio by the action of boron trifluoride) and having a molecular weight of about 2,800,000 as a 10% solution in methylene chloride, followed by 4 parts of dicyandiamide and 2 parts of a bisurea [the 1,1'-(4-methyl-m-phenylene)-bis(3,3-dimethylurea)] of Nawakowski et al. U.S. Pat. No. 3,386,955 as cohardeners. The product is a homogeneous mixture of the components or low condensation products of the bisphenol A with the dicyandiamide and the urea, or a mixture of the components with the low condensation product.

A part of the resulting syrup is then extruded as a film upon release paper and heated briefly to volatilize the solvent. The resulting film (the "test" film) peels easily from the paper. The film is strong and self-sustaining, and possesses excellent "cold" (70° F.) tack properties, remaining firmly in place when pressed against the underside of a horizontal aluminum sheet.

A control film is prepared in the same manner except that it contains none of the toughening polymer.

EXAMPLE 2

The procedure of Example 1 is repeated except that the amount of toughening agent is increased to 15%.

EXAMPLE 3

The procedure of Example 1 is repeated except that the amount of toughening agent is increased to 20%.

EXAMPLE 4

The procedure of Example 1 is repeated except that the amount of toughening agent is increased to 25%.

EXAMPLE 5

The bonding properties of the adhesives of Examples 1–4 in thermoset state are determined as follows:

The shear strength (dry) of the adhesive is determined by overlapping ½" of the ends of two 4" x 12" strips of cleaned and acid-washed aircraft grade aluminum 0.064" in thickness and placing in the resulting lap (4" x ½") an appropriately sized piece of the adhesive film to be tested. The assembly is subjected to a pressure of 40 lb./in.$^2$ and a temperature of 250° F. for one hour (which thermosets the adhesive), and is then cut into strips of suitable width for testing. The shear strength is determined by straight line pull, and is the pull (pounds per square inch of lap) necessary to cause the bonded area (the joint) to fail.

Shear strength (wet) is determined in the same manner except that after the adhesive has thermoset the laminate is boiled in water for three days and the sample is immersed in water during the straight line pull to ensure that the bonded area is of maximum wetness.

Peel strengths are determined on laminate prepared in the same manner except that the 4" x 12" strips are completely overlapped and sufficient adhesive is used so that the bonded area extends from one end of the assembly to the midpoint thereof. The cemented portion thus has an area of 4" x 6", and half of the area of the assembly is uncemented. For the "climbing drum" test one of the strips of the assembly (at a place where it is uncemented) is bolted against a vertical steel plate and the other strip is peeled upwardly away from the bolted strip against an unfixed steel roller or drum 3" in diameter which climbs up along the assembly as the peeling action progresses.

"Bell" peel strength is determined by peeling both laminae of an assembly such as is used for the "climbing drum test" between two fixed rollers separated by a distance equal to the thickness of the laminate. The laminae are peeled apart against these rollers, each of which thus acts as a mandrel for one of the laminae.

The tests are performed over a wide temperature range illustrating temperatures experienced by aircraft in operation.

The adhesives used are those of Examples 1, 2, 3 and 4, and are tested against a control which is prepared by the method of Example 1 except that it contains none of the toughener.

Results are as follows:

| Test | Parts toughener in compn.[a] | | | | |
|---|---|---|---|---|---|
| | None (control) | 10 | 15 | 20 | 25 |
| Shear, dry:[b] | | | | | |
| 180° F | 2,400 | 3,650 | 3,900 | 3,300 | 3,200 |
| 73° F | 3,200 | 5,575 | 6,075 | 4,950 | 5,300 |
| −67° F | 4,000 | 6,200 | 7,275 | 6,725 | 7,300 |
| Shear, wet[b] (after 3-day boil), 73° F | 2,600 | 3,800 | 4,425 | 3,675 | 4,400 |
| Peel, climbing drum,[c] 73° F | [d]0 | 76 | 74 | 94 | 102 |
| Peel, bell:[c] | | | | | |
| 73° F | [d]0 | 60 | 63 | 67 | 65 |
| −67° F | [d]0 | 50 | 68 | 77 | 76 |

[a] Per 100 parts by weight of adhesive components. See Examples 1, 2, 3 and 4.
[b] Lb. of pull per square inch of lap.
[c] Lb. per inch of width of laminate.
[d] Sheets virtually fall apart at start of peel.

EXAMPLE 6

The procedure of Example 1 is repeated except that the toughening agent is a homopolymer of epichlorohydrin having a molecular weight of about 500,000. The film product is a stronger adhesive when thermoset than the control film of Example 1.

EXAMPLE 7

Samples of nylon, polyester (Dacron), polynitrile (Orlon) and glass fiber cloth are impregnated by immersion in the syrup of Example 1. Excess syrup is wiped off with a glass rod, and the solvent is evaporated at 140° F.–160° F. The resulting samples of laminated cloth can be readily cut with scissors, and the shapes thus made possess very good cold tack. They are as effective adhesives as the unsupported films of Example 1–4.

EXAMPLE 8

Samples of the impregnated cloths of Example 6 are thermocured by being placed in an oven at 275° F. for 1 hour. The samples was very strong. The sample containing the fiberglass cloth possesses outstandingly high strength.

EXAMPLE 9

The procedure of Example 1 is repeated except that epichlorohydrin-ethylene oxide copolymer is prepared by copolymerizing the two materials in 7:3 molar ratio. The adhesive film possesses substantially the same properties as the test film of Example 1.

EXAMPLE 10

The procedure of Example 1 is repeated except that the epichlorohydrin-ethylene oxide copolymer is prepared by copolymerizing the two materials in 3:7 molar ratio. The adhesive film possesses substantially the same properties as the test film of Example 1.

We claim:

1. A thermosetting epoxy-amine adhesive composition composed of a homogeneous mixture of polyfunctional epoxides having at least two epoxy group per molecule and polyfunctional amines or low condensation products thereof, said composition having an effective uniformly distributed dissolved content as latent toughening agent of a water-insoluble non-tacky rubbery polymer having a molecular weight in excess of 100,000 selected from the group consisting of polyepichlorohydrin and copolymers of epichlorohydrin with up to 90 mol percent of at least one alkylene mono-oxide copolymerizable therewith, the weight of said polymer being at least about 10% of the weight of the epoxy-amine component in said composition.

2. A composition according to Claim 1 wherein the toughening agent is polyepichlorohydrin.

3. A composition according to Claim 1 wherein the toughening agent is a copolymer of epichlorohydrin and ethylene oxide in about 60:40 molar ratio.

4. A composition according to Claim 1 wherein the toughening agent is a copolymer of epichlorohydrin and propylene oxide in about 60:40 molar ratio.

5. A composition according to Claim 1 wherein the molecular weight of the toughening agent is in the range of 500,000 to 5,000,000.

6. A composition according to Claim 1 in film form.

7. A textile impregnated with a composition according to Claim 1.

8. Fiberglass cloth impregnated with a composition according to Claim 1.

9. A laminate consisting essentially of aluminum sheets bonded together by a composition according to Claim 1 in thermoset state.

References Cited

UNITED STATES PATENTS

| | | | |
|---|---|---|---|
| 3,058,921 | 10/1962 | Pannell | 260—830 TW |
| 3,365,516 | 1/1968 | Prescott | 260—830 R |
| 3,281,491 | 10/1966 | Smith | 260—830 TW |
| 3,477,966 | 11/1969 | Doss | 260—830 TW |

OTHER REFERENCES

Chemical Abstracts, vol. 73, 1970, Abstract No. 4552m.

PAUL LIEBERMAN, Primary Examiner

U.S. Cl. X.R.

117—126 GE, 132 BE, 138.8 F, 138.8N; 161—184, 186; 260—830 TW

UNITED STATES PATENT OFFICE
CERTIFICATE OF CORRECTION

Patent No. 3,830,874   Dated August 20, 1974

Inventor(s) JAMES FRANCIS VASIL and JOSEPH S. BURSEL

It is certified that error appears in the above-identified patent and that said Letters Patent are hereby corrected as shown below:

Column 2 line 40.  After "epichlorohydrin," delete -- a --;
Column 2 line 52.  Change "with" to -- within --.
Column 4 line 1.   Change "amounts" to -- amount --.

Signed and sealed this 3rd day of December 1974.

(SEAL)
Attest:

McCOY M. GIBSON JR.
Attesting Officer

C. MARSHALL DANN
Commissioner of Patents